(No Model.)
W. ELBORNE.
STATURE INDICATOR.
No. 558,014. Patented Apr. 7, 1896.
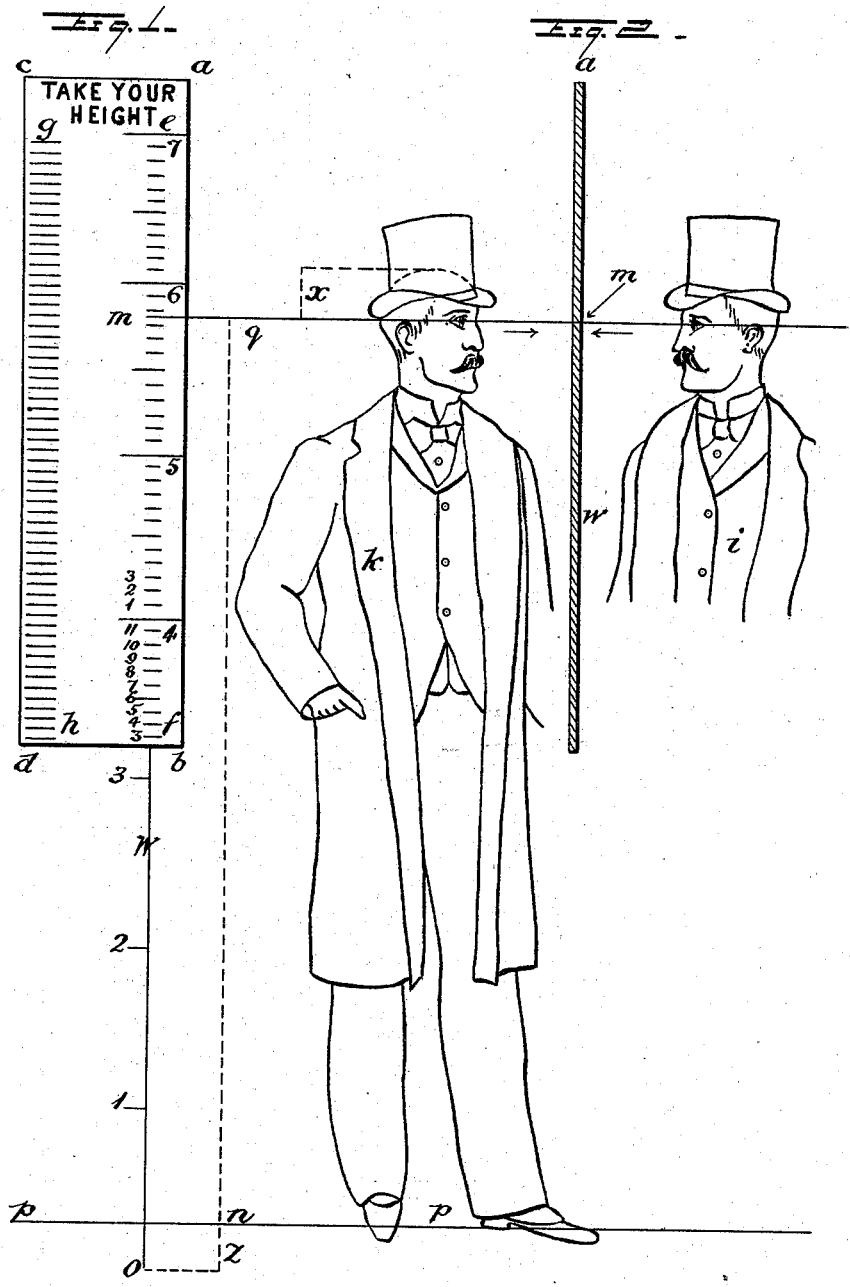
Witnesses
Inventor
William Elborne
by his Attorney

UNITED STATES PATENT OFFICE.

WILLIAM ELBORNE, OF PETERBOROUGH, ENGLAND, ASSIGNOR OF ONE-HALF TO FREDERICK SMALLBONES, OF SAME PLACE.

STATURE-INDICATOR.

SPECIFICATION forming part of Letters Patent No. 558,014, dated April 7, 1896.

Application filed October 3, 1895. Serial No. 564,570. (No model.)

*To all whom it may concern:*

Be it known that I, WILLIAM ELBORNE, gentleman, a subject of the Queen of England, and a resident of the city of Peterborough, county of Northampton, England, have invented a certain new and Improved Means for Ascertaining Stature, of which the following is a full, clear, and exact description.

The object of this invention is to enable persons by the sense of vision alone to ascertain their stature without contact with the measuring scale or devices.

The invention is illustrated in the annexed drawings, which represent, in—

Figure 1, the apparatus, illustrating in Fig. 2, also, its mode of use.

For this purpose the invention consists of a plane mirror $a\,b\,c\,d$ of convenient size, supported or suspended in a vertical plane in any suitable place where persons desirous of ascertaining their stature may stand before such mirror in order to see their reflected images therein. This mirror has in combination with it a scale $e\,f$ or scales $e\,f\,g\,h$ of divisions preferably representing the one feet and inches, the other meters and centimeters, being divided into parts and so placed or arranged vertically upon or otherwise in relation to said mirror that the observer $k$, standing before the mirror, (shown in section $a\,b$,) may readily read off upon such scale or scales the measurement of that division which appears to him to coincide with the reflection of the apex of his ear in the mirror. If the observer's head is so balanced or tilted that the pupils of his eyes appear to be on a level with the apices of his ears in the reflected image, the distance $z$ vertically from the eyes to the plane of the level of the crown of the head may be expressed by a dimension which is constant or so nearly constant for all persons that it may for all practical purposes be deemed a constant. According to this invention, therefore, the aforesaid mirror $a\,b\,c\,d$, with its scale or scales, is so fixed upon a support, such as a wall W, that the zero of the scale $e\,f$ (imagined to be prolonged downward to its zero-point at $o$ in the drawings) is below the horizontal plane $p\,p$ of the place upon which the observer stands for a certain distance $z$. This distance $z$ may be equal to the above constant $x$, which I have determined by experimental measurement to be approximately three and three-quarter inches, or ninety-five millimeters. In practice I may also allow for the average thickness of the heels of the boots of the observer—say one inch—and deduct this second constant from the first, placing the scale so that its zero is lower, by the amount of the difference of these two constants, than the floor or the like on which the observer stands. By this combination the measurement $n\,q + z$ read off at $m$ by the observer, as aforesaid, will be the measurement of the stature $n\,q + x$ of the observer. (Seen also in section $a\,b$, which is taken through line $a\,b$ of the mirror, $i$ being the reflected image of $k$.)

The mirror may be surrounded by a frame bearing directions for or explanations of use of the instrument, which may be as follows: "Directions to take your height: In this mirror you may read your height. Without removing your hat observe on the scale the height of the top of your ear in your image, the position of your eyes being level with the top of your ears. The measurement thus observed is your height as you now stand."

Spaces for advertisements may be added, or the latter may be placed upon the face of the mirror or otherwise placed so that this device may be used as a medium for advertising.

It is obvious that instead of fixing the mirror at the height named it might be fixed at any arbitrary height if accompanied by a direction for adding or subtracting an equivalent constant to or from the measurement read off, as aforesaid, to find the true height of the observer.

What I claim as my invention, and desire to secure by patent, is—

The combination with any platform and support of a vertical mirror carried by said support and a vertical scale or scales adapted to be visible to and to intersect the horizontal plane of vision of a person standing on said platform and observing his reflected image in said mirror the zero-point of said scale or scales being below the platform for such distance that the measurement of said intersection shall be the height of the observer.

In witness whereof I have signed this specification in presence of two witnesses.

WILLIAM ELBORNE.

Witnesses:
H. J. HADDAN,
A. E. MELHINSH.